Figure 1:
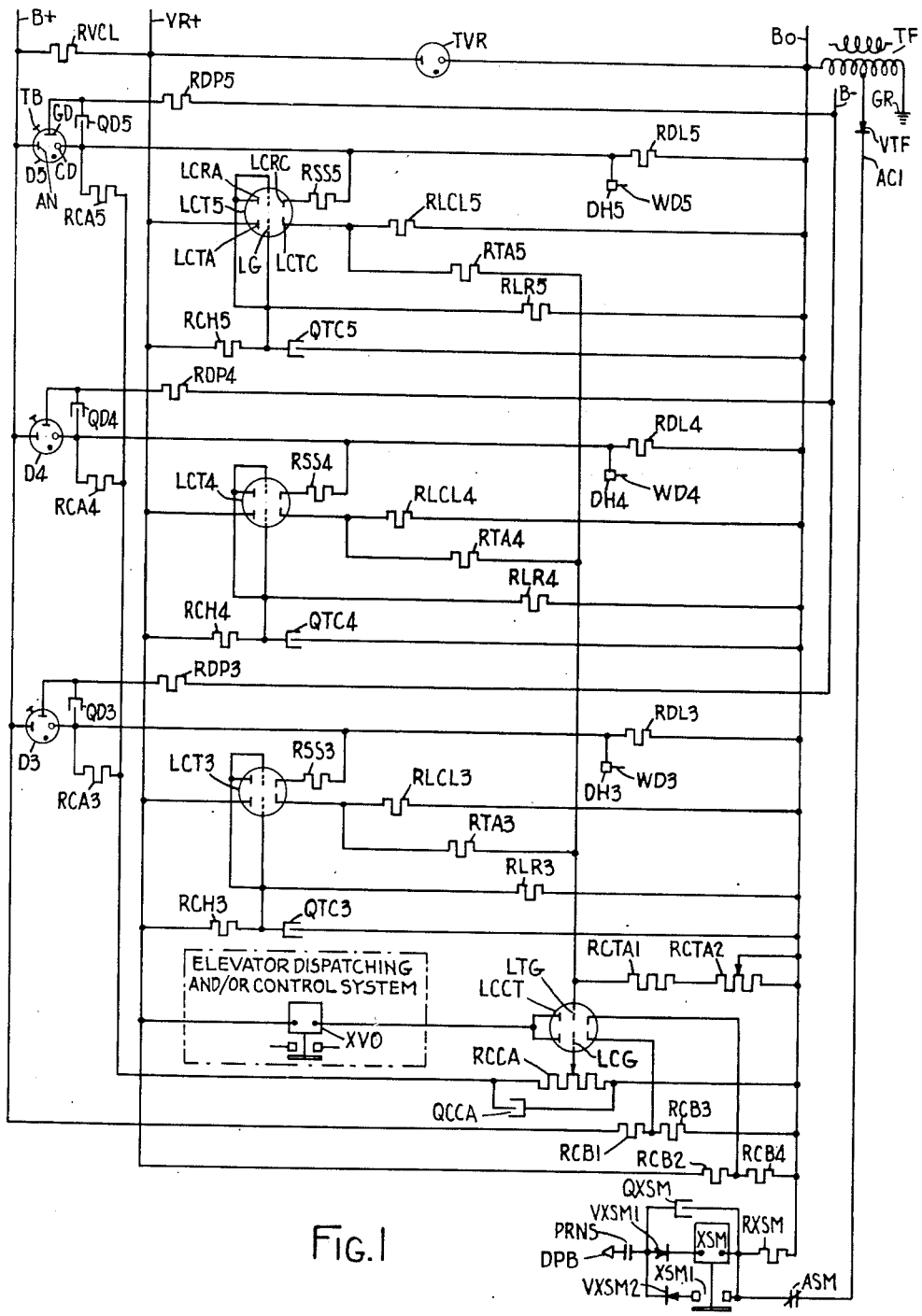

Patented Nov. 25, 1952

2,619,592

UNITED STATES PATENT OFFICE 2,619,592

CALL MEASURING APPARATUS

Arthur Willard Paulson, Summit, N. J., Stephen Anthony Hornung, New York, N. Y., and Harold Edward Galanty, Hillside, N. J., assignors to Otis Elevator Company, New York, N. Y., a corporation of New Jersey Application April 28, 1950, Serial No. 158,722

13 Claims. (Cl. 250—27)

1

The invention relates to measuring apparatus, especially for use in effecting call measurements in elevator systems.

In many elevator systems, controls are provided for floors served by the cars for registering calls for these floors. In the majority of these systems, these calls cause the automatic stopping of the cars at the floors for which the calls are registered. This is usually true of elevator dispatching and control systems to which the invention is especially applicable. When the stops are made in such systems, the calls are automatically cancelled incident to the stopping operations. It may happen, especially under certain traffic conditions, that calls remain unanswered for considerable periods. Also, a great number of unanswered calls may be in registration at the same time. Information that such conditions exist is of advantage in the control of the cars and/or of the manner of operation of the system.

It is one object of the invention to provide apparatus for measuring the total accumulated time that registered calls remain unanswered.

It is another object of the invention to provide apparatus for measuring the total number of registered calls that remain to be answered.

It is still another object of the invention to provide apparatus for measuring both the total accumulated time that calls remain unanswered and the total number of such calls, in which the measurements modify each other.

In the copending application of William Frank Glaser and Stephen Anthony Hornung, Serial Number 155,462, filed April 12, 1950, which relates to an elevator dispatching and control system, the preferred arrangement of the invention is disclosed as applied to down landing calls for certain lower floors. The measurement obtained is utilized in that system to control the switchover to "zone return" operation under down peak traffic conditions. However, the invention is applicable to up landing calls and calls registered from within the cars, as well as to down landing calls, and also to various combinations thereof. Also the measurements obtained may be used for other purposes. While especially applicable to plural elevator systems, the invention is also applicable to single elevator systems.

In carrying out the invention according to the preferred arrangement, when a call is registered for a floor, the control potential applied to a vacuum type electron tube common to the floors is raised. As the number of calls increases, the control potential increases as does the current flow through the tube. This provides a measurement of the total number of unanswered calls.

2

The registration of a call also causes the application of a control potential to a vacuum type electron tube for the floor for which the call is registered. This potential is increased as the call remains registered, causing increasing current flow through the tube. This increasing current flow causes a gradual increase in control potential applied to the aforementioned vacuum tube common to the floors. Additional calls cause a further gradual increase in the control potential applied to the tube common to the floors and thus a gradual increase in current flow through this tube. This provides a measurement of the total accumulated time that registered calls remain unanswered. By superimposing these control potentials on the same tube and controlling an electroresponsive device by the current flow in the tube, the operation of the electroresponsive device is effected as soon as the unanswered calls reach a certain number or as soon as the total accumulated time that calls remain unanswered reaches a certain amount which depends on the number of calls.

Features and advantages of the invention will be seen from the above statement and from the following description and appended claims.

Figure 2:
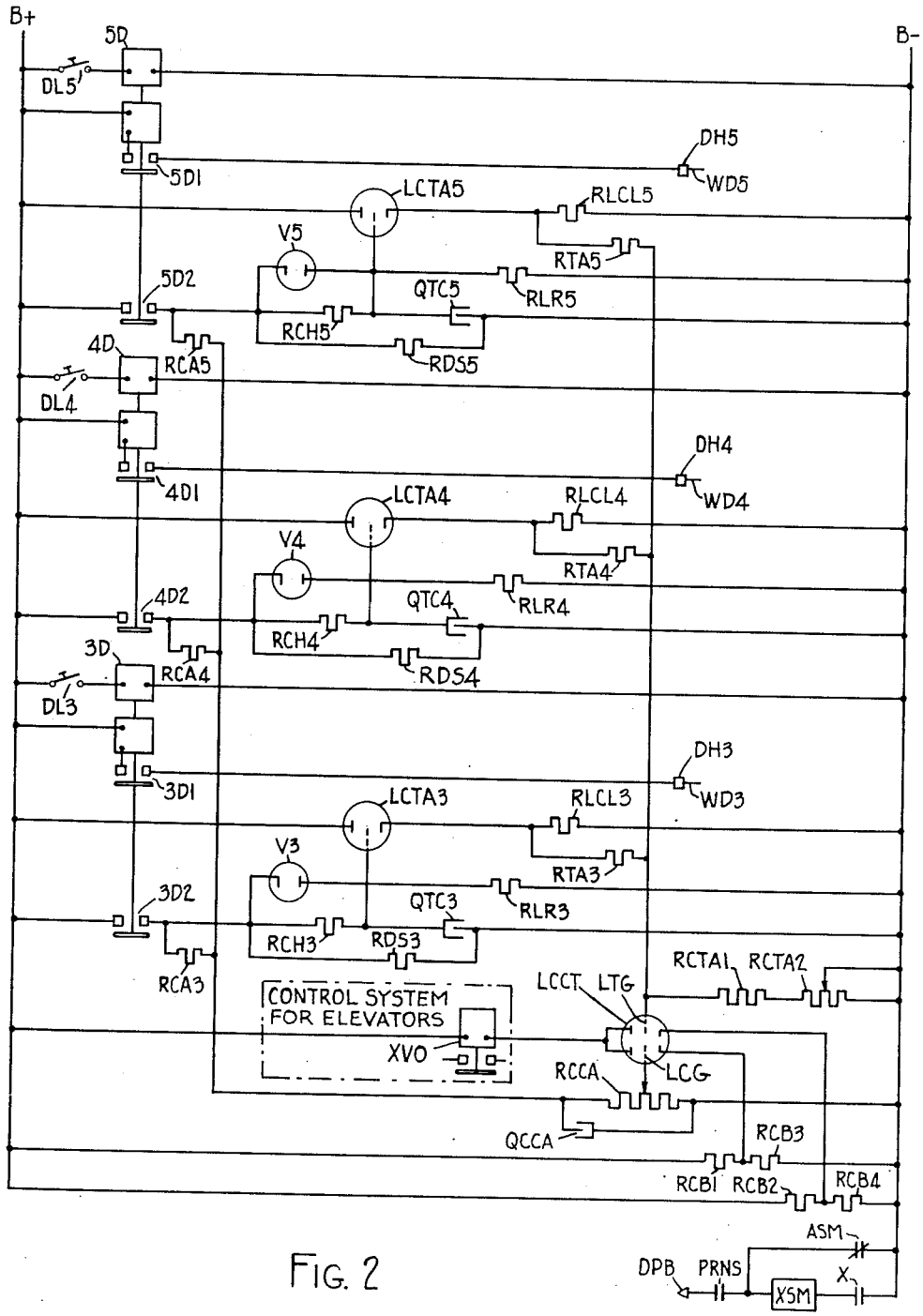

In the drawings:

Figure 1 is a schematic "across the line" wiring diagram of call time accumulation circuits in connection with call registration circuits common to the elevator cars and call pick-up and automatic call cancelling circuits for a single elevator car, with the calls registered on electronic tubes; and Figure 2 is a schematic "across the line" wiring diagram of a different arrangement of circuits for call time accumulation, call registration, call pick-up and automatic call cancellation, with the calls registered on electromagnetic latching type relays.

Referring first to Figure 1, the various feed circuits are designated B+, VR+, AC1, Bo and B—. Lines B+, VR+, Bo and B— are direct current voltage lines, line Bo also serving as an alternating current line. TVR is a voltage regulator tube for providing direct current voltage of constant value between lines VR+ and Bo. TF is a transformer, one end of the secondary of which is connected to line Bo and the other end of which is connected to ground GR. Line AC1 is tapped off the secondary of transformer TF.

The circuits are shown for the third, fourth and fifth floors as representative of certain lower floors of an elevator installation. Also the circuits are shown in connection with down landing call registering controls for those floors. These controls are designated D3, D4 and D5 for the third, fourth and fifth floors respectively. Each of these controls according to the preferred arrangement comprises an electronic tube and a fixed button connected to the tube envelope with the circuits arranged so that the tube breaks down in response to manual touch of the fixed button and remains conductive, thereby registering the call and enabling the touch to be discontinued. These electronic tubes are cold cathode gas tubes, the type having a wire anode extending to within a short distance of the glass envelope of the tube, such as the RCA, IC21, having been found satisfactory. With such a tube, the button is connected to the tube envelope adjacent the anode. The tubes of the type mentioned are three element tubes having an anode, a cathode and a control electrode designated for control D5 for example, as AN, CD and GD respectively, with the fixed button designated TB.

The call counting and time accumulation circuits individual to the floors are the same for each floor and include loading resistor RDL for the tube of the call registering control, condenser QD for insuring the putting out of the tube by the automatic call cancelling operation as the call is answered, protective resistor RDP and call counting resistor RCA. Also included in the circuits are timing condenser QTC, charging resistor RCH and landing call time tube LCT. RSS is a surge suppressing resistor in the control of tube LCT, RLCL is a load resistor for tube LCT, RLR is a leak resistor and resistor RTA is a time accumulative resistor. Tube LCT is a dual triode vacuum tube of the 6SN7 type. These elements for each floor are differentiated by appended reference numerals as in the case of the landing controls.

Certain elements are common to the floors and include current limiting resistor RVCL for voltage regulator tube TVR, rectifier VTF to insure positive pulses for putting out the call registering tubes, common call accumulative resistor RCCA, stabilizing condenser QCCA, common time accumulative resistors RCTA, landing call time accumulative tube LCCT controlled by the potential drops across resistors RCCA and RCTA, and cathode bias resistors RCB for tube LCCT. Tube LCCT is a dual triode vacuum tube of the 6SN7 type.

For the voltage values specified for the electronic control circuits and for the types of electronic tubes specified, the following ohmic values of resistors and capacities of condensers in the electronic circuits have been found satisfactory:

| Resistors: | Ohms |
|---|---|
| RCA | 470,000 |
| RCB1 | 10,000 |
| RCB2 | 10,000 |
| RCB3 | 560 |
| RCB4 | 220 |
| RCCA | 1,500 |
| RCH | 6.8 meg |
| RCTA1 | 10,000 |
| RCTA2 | 50,000 |
| RDL | 3,000 |
| RLCL | 120,000 |
| RLR | 10 meg |
| RSS | 22,000 |
| RTA | 470,000 |
| RVCL | 1,500 |

| Condensers: | Microfarads |
|---|---|
| QCCA | .25 |
| QTC | 20 |

Mechanism actuated in accordance with car movement is utilized in the call pick-up and automatic call cancelling circuits. In the circuits illustrated, this comprises stationary contacts DH3, DH4 and DH5 for the third, fourth and fifth floors respectively connected to the left hand side of load resistors RDL for these floors. These contacts are spaced in accordance with the distance between floors and are adapted to be engaged by a brush DBP movable in accordance with car movement. The engagement of the brush with the stationary contacts controls the operation of a relay XSM. Various contacts may be arranged in the brush circuit, but one of which designated PRNS is shown. These contacts are engaged whenever the car is set for downward travel and is not running non-stop. A similar arrangement is provided for each of the other cars of a plural elevator system in which the stationary contacts of the mechanisms actuated in accordance with movement of the cars are connected together as indicated by the wires WD3, WD4 and WD5.

A call registering operation will first be described. It is to be noted that the anode-cathode circuit of the tube of each landing button is from line B+ through the tube and load resistance RDL to line Bo. The 150 volts direct current thus applied to the tube is not sufficient to break down the tube. However, upon an intending passenger touching a landing button, a circuit is established from ground GR through the secondary of transformer TF to line Bo which is connected through line B+ to the anode of the tube and thence from the tube envelope through the body of the intending passenger back to ground. As a result, sufficient alternating current voltage is applied between the anode and the tube envelope to break down the tube, registering the call. When the tube fires, it becomes illuminated to indicate that the landing call is registered.

Assume that an intending passenger at the fifth floor touches landing button D5 registering a down call for the fifth floor. Assume further that the car is above the fifth floor and is travelling in the down direction. Upon the engagement of brush DPB with contact DH5, a circuit is completed which connects the coil of relay XSM across the loading resistance RDL5, the circuit being from the left hand side of resistance RDL5 through contact DH5, brush DPB, contacts PRNS, rectifier VXSM1, coil XSM, resistor RXSM, to line Bo back to the right hand side of resistor RDL5. The potential drop across resistor RDL5 applied to coil XSM is sufficient to operate this relay. Upon operation relay XSM causes the car to be slowed down and stopped at the fifth floor, these circuits not being shown.

Incident to initiating the slowing down of the car, contacts ASM engage, having being separated during running of the car. This, together with the operation of relay XSM completes a circuit from the tapped point of the secondary of transformer TF through rectifier VTF, by way of line AC1, through contacts ASM and XSM1, rectifier VXSM2, contacts PRNS, brush DPB, and contact DH5 to the cathode of the tube of button D5. Rectifier VTF passes the positive halves of the alternating current cycle, thus raising the potential of the cathode with respect to the anode. This reduces the voltage across the tube to below sustaining value, pulsing out the tube. Thus the down landing call at the fifth floor is automatically cancelled as soon as the call is picked up and contacts ASM engage. Relay XSM drops out incident to the cancelling of the call. Rectifier VXSM1 blocks the flow of current from line AC1 through the coil of relay XSM upon the engagement of contacts ASM, preventing relay XSM being held in or reoperated.

The calls are not answered immediately they are registered unless a car happens to be in the immediate position to do so. It may happen, especially during periods of heavy down peak traffic, that the down calls at the lower floors remain unanswered for considerable periods beyond average waiting time. When there are a number of unanswered down calls for certain lower floors (three, four and five in the circuits illustrated) and their cumulative waiting time reaches a certain amount, depending on the number of such calls, or when such calls reach a certain number, a control operation is effected. This is effected through the control of tube LCCT. The voltage regulator tube TVR provides a fixed potential for charging condensers QTC to insure a uniform timing operation. So long as no down landing call is registered for the particular floor, there is a shunt circuit of relatively low resistance for the timing condenser QTC for that floor so that the charge built up on the condenser is negligible. However, as soon as such down call is registered, a change in potential is effected in this shunt circuit which blocks current flow therethrough, thereby starting the charging operation.

In order that this may be readily understood, refer by way of example to the circuits for the fifth floor. The charging circuit for timing condenser QTC5 is from line VR+ through charging resistor RCH5 and condenser QTC5 to line Bo. The relatively low resistance shunt circuit across the condenser is from the junction of resistor RCH5 and condenser QTC5 through anode LCRA and cathode LCRC of tube LCT5, and resistors RSS5 and RDL5 to line Bo, the particular portion of tube LCT5 through which the shunt circuit passes serving as a rectifier. As soon as call registering tube D5 is fired to register a down landing call for the fifth floor, it raises the potential of the left hand side of resistor RDL5 to a point which is higher than the potential of the junction of condenser QTC5 and resistor RCH5. This blocks the flow of current through the rectifier portion of tube LCT5 and thus initiates the charging of the timing condenser QTC5. Prior to the initiation of the charging operation, the grid LG of tube LCT5 is maintained at substantially the potential of line Bo which limits the flow of current across the anode LCTA-cathode LCTC of the other portion of the tube to a low value. However, as soon as the charging operation starts, the potential of the grid rises to permit a gradual increase of current flow through the anode LCTA-cathode LCTC circuit of the tube.

The gradual increase in current flow in tube LCT5 causes a gradually increasing potential drop across load resistor RLCL5. This in turn increases the current flow by way of resistor RTA5 through resistors RCTA1 and RCTA2. This gradually increases the potential drop across resistors RCTA with the result that the potential of the grid LTG of tube LCCT is gradually raised. If a down landing call is registered for another of these floors, current flow through tube LCCT is further increased due to the further gradual increase in potential drop across resistors RCTA as the charging of the condenser for this floor takes place. When any one of these calls is answered, the call is automatically cancelled as above set forth. As soon as the call registering tube is pulsed out, the charging of condenser QTC for the corresponding floor is discontinued and the condenser is discharged. Say for example that the down call for the fifth floor is the one cancelled, condenser QTC5 discharges by way of the anode LCRA-cathode LCRC circuit of tube LCT5 into resistors RSS5 and RDL5. Thus the charge on condenser QTC5 is not immediately dissipated, thus preventing tube D5 being pulsed back on. However, this discharge takes place fairly rapidly so as not to effect the unwanted operation of tube LCCT.

When each of these down landing calls is registered, current is supplied to common call accumulative resistor RCCA through the call accumulative resistor RCA for the floor for which the call is registered. Referring again to the fifth floor circuits for example, resistor RCCA is connected in series with resistor RCA5 across resistor RDL5. Thus when a down fifth floor call is registered, the potential drop across resistor RDL5 is applied to resistors RCA5 and RCCA in series, causing a certain amount of current flow in resistor RCCA. Each additional one of these down calls completes a parallel circuit through the RCA resistor for resistor RCCA, increasing the current flow therethrough and thus the potential drop across resistor RCCA. An adjustable point on resistor RCCA is connected to grid RCG of tube LCCT. Thus each registered down call for these floors increases the potential of grid LCG, also causing increase in current flow through tube LCCT.

When the amount of current flow through tube LCCT due to the combined effect of the number of calls and their total accumulative registered time reaches a certain amount, relay XVO operates, the coil of this relay being connected in circuit with the tube. The operation of relay XVO may be utilized for various purposes. In the copending application of Glaser and Hornung above referred to, this relay is utilized to control the switch-over to "zone return" operation. This has been indicated on the drawings by associating the legend "Dispatching and/or Control System" with relay XVO, placing this relay within the box formed by the encompassing lines for the legend. Relay XVO is the same as relay XVO of that application and the other circuits here illustrated are the same as in that application and are similarly designated. The current flow through tube LCCT may be utilized in other ways as for example to operate a meter calibrated to register the demand for service. This visual indication could be used for example by the starter of a dispatching system for directing the operation of the cars. Where a switching operation is to be utilized, tube LCCT may be a gas tube instead of a vacuum tube.

Other arrangements may be employed. For example, floor relays controlled by push buttons may be utilized to register calls. A schematic arrangement of call time circuits in connection with electromagnetic latching type call registering relays is shown in Figure 2. Here again the circuits are shown for the third, fourth and fifth floors and in connection with down landing call registering controls. The floor relays are designated 3D, 4D and 5D for the third, fourth and fifth floors respectively, while the push buttons which operate these relays are designated DL3, DL4 and DL5 for floor relays 3D, 4D and 5D respectively.

The call counting and time accumulative circuits individual to the floors are the same for each floor and include timing condenser QTC, charging resistor RCH, landing call time tube LCTA, load resistor RLCL, discharge resistor RDS, blocking rectifier tube V, leak resistor RLR, time accumulative resistor RTA and call counting resistor RCA. The call counting and time accumulative circuits common to the floors have been illustrated as the same as those of Figure 1. Tube LCTA is a vacuum tube of the 6J5 type while tube V is a rectifier tube of the 6H6 type.

Mechanism actuated in accordance with car movement is employed and has been indicated the same as in Figure 1. The circuits controlled thereby however are somewhat different. This will be seen from the description of operation.

Assume that an intending passenger at the fifth floor presses landing button DL5, completing a circuit for the operating (top) coil of call registering relay 5D. This relay operates and latches itself in operated condition, as by residual magnetism, enabling the button to be released. Upon the engagement of brush DPB with contact DH5 during downward car travel, a circuit is completed by way of the reset (lower) coil of the relay, contacts 5D1 of the relay, contact DH5, brush DPB, contacts PRNS, coil of relay XSM and interlock contacts X. This causes operation of relay XSM, in turn causing the car to be slowed down and brought to a stop at the fifth floor. Incident to the initiation of the slowing down of the car, contacts ASM engage, having been separated during the running of the car. This causes sufficient current flow through the reset coil of relay 5D to cause reset of the relay and thus the automatic cancellation of the call.

As soon as a down landing call is registered for any of floors three, four and five, a charging circuit is established for the timing condenser for that floor. Assuming the call is registered for the fifth floor, contacts 5D2 engage to complete the charging circuit through resistor RCH5 and condenser QTC5. This gradually raises the potential of the control grid of tube LCTA5, causing a gradual increase in current flow in the anode-cathode circuit of the tube. The resultant gradual increase in potential drop across resistor RLCL5 causes, in turn, increasing current flow by way of resistor RTA5 through resistors RCTA. This gradually raises the potential of grid LTG of tube LCCT as previously described. Down landing calls for others of these floors further raise the potential of grid LTG. The registration of these down landing calls causes current flow by way of resistors RCA through resistor RCCA of an amount dependent on the number of calls. This places potential on grid LCG of tube LCCT of a value determined by the number of such calls. When the amount of current flow through tube LCCT reaches a certain amount, relay XVO is operated as before.

When applied to a plural elevator system, the corresponding stationary contacts of the car actuated mechanisms, are connected together as in the case of Figure 1. The brush circuits, however, are individual to the cars. While the invention is especially applicable to dispatching and control systems in which the cars are stopped automatically at the floors for which calls are registered, it is also applicable to systems in which the attendants stop the cars at the floors for which calls are registered. Also the invention is applicable to systems without dispatching, for example, collective control systems. This has been indicated in Figure 2 by associating the legend "Control Systems for Elevators" with relay XVO. The particular arrangement disclosed for measuring the total accumulated time that calls remain unanswered is of considerable advantage and may be used alone without the call counting portion of the apparatus. Also various alterations may be made in the circuits, as for example by omitting tubes LCT and utilizing the voltages across the condensers direct. Also separate tubes LCCT may be employed, one for call counting and the other for total accumulated time measurement, and separate relays may be controlled by these tubes. This would be of advantage where different control operations are exercised by these relays.

Thus many changes could be made in the above apparatus and many apparently widely different embodiments of this invention could be made without departing from the scope thereof, and it is intended that all matter contained in the above description or shown in the accompanying drawings shall be interpreted as illustrative and not in a limiting sense.

What is claimed is:

1. In an elevator system in which controls are provided for each of a plurality of floors for registering calls for those floors, apparatus for measuring the total accumulated time that calls for such floors remain unanswered, said apparatus comprising; a condenser for each of said floors; a charging circuit for each of said condensers established by the registration of said call for the floor for which said condenser is provided; an electroresponsive device; and means controlled by the charge on said condensers for controlling the operating of said electroresponsive device in accordance with the total accumulated time that said calls for said floors are unanswered.

2. In an elevator system in which controls are provided for each of a plurality of floors for registering calls for those floors, apparatus for measuring the total accumulated time that calls for such floors remain unanswered, said apparatus comprising; a condenser for each of said floors; a charging circuit for each of said condensers established by the registration of said call for the floor for which said condenser is provided; an electronic tube common to said floors having a control electrode; an electroresponsive device connected in the anode-cathode circuit of said tube; and means controlled by the charge on said condensers for applying a potential to said control electrode in accordance with the total accumulated time that said calls for said floors are unanswered.

3. In an elevator system in which controls are provided for each of a plurality of floors for registering calls for those floors, apparatus for measuring the total accumulated time that calls for such floors remain unanswered, said apparatus comprising; a timing condenser for each of said floors; a charging resistor for each of said condensers; a charging circuit for each of said condensers established by the registration of said call for the floor for which said condenser is provided and extending through said charging resistor for that condenser; a vacuum tube for each of said floors having its control grid potential subject to the amount of charge on said condenser for that floor; a loading resistor for each tube in the anode-cathode circuit thereof; a vacuum tube common to said floors; means controlled by the potential drop across said loading resistors for applying a potential to the control grid of said tube common to said floors; and an electroresponsive device in the anode-cathode circuit of said vacuum tube common to said floors operable when the current flowing through such tube reaches a certain value.

4. In an elevator system in which controls are provided for each of a plurality of floors for registering calls for those floors, apparatus for measuring the total accumulated time that calls for such floors remain unanswered, said apparatus comprising; a timing condenser for each of said floors; a charging resistor for each of said condensers; a charging circuit for each of said condensers through said charging resistor for that condenser established by the registration of said call for the floor for which said condenser is provided; a resistor common to said floors; a time accumulative resistor for each floor connected in series with said common resistor to be controlled by the charge on said condenser for that floor so as to cause the potential drop across said common resistor to be in accordance with the total accumulated time that said calls for said floors are unanswered; an electronic tube having its control electrode subject to said potential drop across said common resistor; and an electroresponsive device connected in the anode-cathode circuit of said tube.

5. In an elevator system in which controls are provided for each of a plurality of floors for registering calls for those floors, apparatus for measuring the total accumulated time that calls for such floors remain unanswered, said apparatus comprising; a timing condenser for each of said floors; a charging resistor for each of said condensers; a charging circuit for each of said condensers established by the registration of said call for the floor for which said condenser is provided and extending through said charging resistor for that condenser; a vacuum tube for each of said floors having its control grid potential subject to the amount of charge on said condenser for that floor; a loading resistor for each tube in the anode-cathode circuit thereof; a resistor common to said floors; a resistor for each floor connected in series with said common resistor across said loading resistor for that floor; and a vacuum tube common to said floors having its grid potential subject to the potential drop across said common resistor.

6. In an elevator system in which controls are provided for each of a plurality of floors for registering calls for those floors, apparatus for measuring the total accumulated time that calls for such floors remain unanswered, said apparatus comprising: a vacuum tube for each of said floors; a loading resistor for each tube in the anode-cathode circuit thereof; a timing condenser for each of said floors; a charging resistor for each of said condensers; a charging circuit for each of said condensers through said charging resistor for that condenser established by the registration of said call for the floor for which said condenser is provided; a connection for each floor extending from the junction point of said condenser and charging resistor for that floor to the control grid of said tube for that floor; a resistor common to said floors; a time accumulative resistor for each floor connected in series with said common resistor across said loading resistor for that floor; an electronic tube common to said floors having a control electrode connected to the junction of said common resistor and said time accumulative resistor; and an electroresponsive device in the anode-cathode circuit of said tube common to said floors operable when the potential of said control electrode of that tube attains a certain value.

7. In an elevator system in which controls are provided for each of a plurality of floors for registering calls for those floors, apparatus for measuring the total accumulated time that calls for such floors remain unanswered, said apparatus comprising; a vacuum tube for each of said floors; a loading resistor for each tube in the anode-cathode circuit thereof; a timing condenser for each of said floors; a charging resistor for each of said condensers; a charging circuit for each of said condensers established by the registration of said call for the floor for which said condenser is provided and extending through said charging resistor for that condenser; a connection for each floor extending from the junction point of said condenser for that floor and its charging resistor to the control grid of said tube for that floor, thus causing a gradual increase in current flow through that tube and thus a gradual increase in potential drop across its loading resistor in accordance with the time that said call for that floor remains unanswered; a resistor common to said floors; a resistor for each floor connected in series with said common resistor across said loading resistor for that floor, thereby causing a gradually increasing potential drop across said common resistor in accordance with the total accumulated time that calls for such floors remain unanswered; a vacuum tube common to said floors having its gird potential subject to the potential drop across said common resistor; and an electroresponsive device subject to the current flow in the anode-cathode circuit of said tube common to said floors operable when such current attains a certain value to register that the total accumulated time of such unanswered calls has attained a certain amount.

8. In an elevator system in which controls are provided for each of a plurality of floors for registering calls for those floors, call measuring apparatus comprising; means controlled by the registration of said calls for said floors in accordance with the number of calls registered; means controlled by said calls in accordance with the total accumulated time that the registered calls for said floors remain unanswered; and electroresponsive means controlled either by said number of calls controlled means or said total accumulated time controlled means or by both.

9. In an elevator system in which controls are provided for each of a plurality of floors for registering calls for those floors, call measuring apparatus comprising; means for each of said floors controlled by the registration of said call for that floor; means for each of said floors controlled by the time that the registered call for that floor remains unanswered; and electroresponsive means controlled by both said call controlled means and said time controlled means for said floors and operable when the total accumulated time that such calls are unanswered reaches a certain amount which decreases as the number of such calls increases.

10. In an elevator system in which controls are provided for each of a plurality of floors for registering calls for those floors, call measuring apparatus comprising; a resistor for each of said floors; a circuit for each of said resistors established by the registration of said call for the floor for which said resistor is provided; a condenser for each of said floors; a charging circuit for each of said condensers established by the registration of said call for the floor for which said condenser is provided; electroresponsive means; and means controlled by the number of said resistor circuits established and by the charge on said condensers for controlling the operation of said electroresponsive means in accordance with the total number of said calls for said floors that are registered and the total accumulated time that such calls remain unanswered.

11. In an elevator system in which controls are provided for each of a plurality of floors for registering calls for those floors, call measuring apparatus comprising; a call counting resistor for each of said floors; a circuit for each of said resistors established by the registration of said call for the floor for which said resistor is provided; a condenser for each of said floors; a charging circuit for each of said condensers established by the registration of said call for the floor for which said condenser is provided; dual electronic tube means having a pair of control electrodes; and means controlled by the number of resistor circuits established for controlling the potential of one of said electrodes and by the charge on said condensers for controlling the potential of the other of said electrodes, thereby controlling said tube means by the total number of said calls for said floors that are registered and by the total accumulated time that such calls remain unanswered.

12. In an elevator system in which controls are provided for each of a plurality of floors for registering calls for those floors, call measuring apparatus comprising; a total call resistor common to said floors; a call counting resistor for each of said floors; a circuit for each of said call counting resistors through said total call resistor established by the registration of said call for the floor for which said resistor is provided; a condenser for each of said floors; a charging circuit for each of said condensers established by the registration of said call for the floor for which said condenser is provided; a total time accumulative resistor common to said floors; a time accumulative resistor for each of said floors connected in series with said total time accumulative resistor to be controlled by the charge on said condenser for that floor; and a dual triode vacuum tube having a pair of control electrodes, one connected to be controlled by the potential drop across said total call resistor and the other connected to be controlled by the potential drop across said total time accumulative resistor, thereby causing current flow through said tube in accordance with the total number of said calls for said floors that are registered and the total accumulated time that such calls remain unanswered.

13. In an elevator system in which controls are provided for each of a plurality of floors for registering calls for those floors, call measuring apparatus comprising; a total call resistor common to said floors; a call counting resistor for each of said floors; a circuit for each of said call counting resistors through said total call resistor established by the registration of said call for the floor for which said resistor is provided; a condenser for each of said floors; a charging circuit for each of said condensers established by the registration of said call for the floor for which said condenser is provided; a vacuum tube for each of said floors having its control grid potential subject to the amount of charge on said condenser for that floor; a loading resistor for each tube; a total time accumulative resistor common to said floors; a time accumulative resistor for each of said floors connected in series with said total time accumulative resistor across said loading resistor for said vacuum tube for that floor; and a dual triode vacuum tube having a pair of control electrodes, one connected to be controlled by the potential drop across said total call resistor and the other connected to be controlled by the potential drop across said total time accumulative resistor, thereby causing current flow through said tube in accordance with the total number of said calls for said floors that are registered and the total accumulated time that such calls remain unanswered.

ARTHUR WILLARD PAULSON.
STEPHEN ANTHONY HORNUNG.
HAROLD EDWARD GALANTY.

REFERENCES CITED

The following references are of record in the file of this patent:

UNITED STATES PATENTS

| Number | Name | Date |
|---|---|---|
| 1,871,787 | Goldsborough | Aug. 16, 1932 |
| 2,252,613 | Bingley | Aug. 12, 1941 |
| 2,287,926 | Zepler | June 30, 1942 |
| 2,329,048 | Hullegard | Sept. 7, 1943 |
| 2,433,424 | Bruns et al. | Dec. 30, 1947 |